Patented Apr. 13, 1954

2,675,326

UNITED STATES PATENT OFFICE 2,675,326

AQUEOUS SOLUTION OF SILK

Thomas C. Whitner, Elizabeth, N. J.

No Drawing. Application May 16, 1950,
Serial No. 162,385

7 Claims. (Cl. 106—161)

This invention relates to the preparation of aqueous solutions which can be employed in operations involving impregnation of fibers with sericeous material.

In U. S. Patent 2,417,388, I have described a method for impregnating cellulose fibers with sericeous material and which included the steps of dissolving silk fibers in an aqueous solution of an alkylolamine-copper complex and an alkali metal hydroxide, saturating cellulose fibers with this solution, and afterwards washing the saturated cellulose fibers with aqueous acid and with water. In my copending application Ser. No. 761,987, Patent #2,565,832 I have disclosed that an organic alkaline substance, namely a tetra-alkylol ammonium hydroxide, can be substituted either in whole or in part for the alkali metal hydroxide. Also, in my copending application Ser. No. 748,674, Patent No. 2,646,372 I have disclosed that in the preparation of aqueous solutions of sericeous material, a tetra-alkylol ammonium hydroxide can serve as both the agent for forming a water-soluble copper complex and as the alkaline agent.

I have observed that copper hydroxide can be dissolved easily and readily in an aqueous solution of an alkali metal hydroxide provided a substantially neutral copper-solubilizing agent is present simultaneously in solution. And such an aqueous solution of copper hydroxide is suitable for the purpose of dissolving silk fibers. I have observed also that employment of a copper-solubilizing agent permits the use of a tetra-alkyl ammonium hydroxide as the alkaline agent in place of an alkali metal hydroxide.

The copper-solubilizing compounds with which I effect dissolution of copper hydroxide in aqueous solutions of alkali metal hydroxides or of tetra-alkyl ammonium hydroxides are water-soluble polyhydroxy alcohols. The polyhydroxy alcohols, which I prefer, may be divided into three general classes: (1) saturated acyclic polyhydroxy alcohols, such as ethylene glycol, glycerine, erythritol and mannitol; (2) polyhydroxy saturated acyclic ethers, such as diethylene glycol, glycerol α-monoethyl ether and glycerol α-monoglyceryl ether; and (3) polysaccharide sugars, such as sucrose and raffinose, which are designated as non-reducing sugars, that is do not react with cupric compounds in aqueous alkaline solutions (e. g., Fehling solution) to furnish water-insoluble cuprous compounds.

As indicated above, the alkaline agents (which I prefer) are the hydroxides of alkali metals, such as lithium, sodium and potassium, and tetra-alkyl ammonium hydroxides, particularly those which do not contain more than four carbon atoms in each alkyl group. All of these hydroxides are classed as water-soluble compounds, for the most part exhibiting a high solubility in water, and are strongly alkaline bodies. For the purposes of this invention, I consider the monoxides of alkali metals to be the equivalents of the corresponding hydroxides since the monoxides react with water to give the hydroxides.

One procedure whereby I obtain an aqueous solution of sericeous fibers includes the following steps: (1) Prepare an aqueous solution containing both alkaline agent and copper-solubilizing compound. This step may be carried out in any convenient manner, as for example, by dissolving solid alkali metal hydroxide in an aqueous solution of the copper-solubilizing compound. Or, an aqueous solution of the polyhydroxy alcohol can be admixed with an aqueous solution of the alkali metal hydroxide. (2) Admix copper hydroxide ($Cu(OH)_2$) with the solution of alkaline agent and copper-solubilizing compound and stir the admixture until the copper compound dissolves and the aqueous solution becomes blue in color. The depth of color will depend, of course, upon the quantity of copper compound in solution. (3) Admix silk fibers with the aqueous copper solution and stir. (4) Filter the solution from any undissolved silk fibers or copper compounds.

As a modification of the above procedure, I dissolve a water-soluble copper salt, such as copper chloride ($CuCl_2 \cdot 2H_2O$) in an aqueous solution containing the polyhydroxy alcohol. Then admix an aqueous solution of the alkaline agent with the solution of copper salt until the initially-formed copper hydroxide, $Cu(OH)_2$, dissolves and a clear blue aqueous liquid is obtained.

In preparing solutions of sericeous material, I prefer to effect dissolution of copper hydroxide and of silk fibers at substantially room temperature. Solution of the copper-solubilizing compound and of the alkaline agent may be accomplished at somewhat higher temperatures, or the aqueous solution of copper-solubilizing compound may become warm due to dissolving therein of the alkaline agent (particularly a solid alkali metal hydroxide). In any event, the aqueous liquid should be cooled (in any convenient manner) to substantially room temperature and maintained at this temperature during dissolution of copper hydroxide and silk fibers. Likewise, treatment of cellulose fibers with the solutions of sericeous material should be effected at substantially room temperature.

Cellulose fibers can be impregnated with the solution of sericeous material by any appropriate procedure, as for example, by immersion of the fibers in the liquid. Afterwards, the fibers may be drained or pressed lightly to remove excess liquid. Then they are washed with an aqueous solution of an acidic agent which forms water-soluble salts with copper hydroxide and with the alkaline agent. Examples of such acidic agents are mineral acids, e. g., hydrochloric or sulfuric acid, and carboxylic acids, e. g., acetic and lactic acids. Subsequent to the treatment with aqueous acid, the cellulose fibers should be washed well with water to remove substantially all water-soluble salts, acidic agent and copper-solubilizing compound.

The following examples will illustrate my invention.

Example 1.—An aqueous solution containing copper hydroxide, $Cu(OH)_2$, was prepared using the following ingredients in the proportions indicated: Two volumes of glycerine were dissolved in 18 volumes of water, and then sodium hydroxide was dissolved in the solution in the proportion of 0.2 g. per 20 cc. of solution. Next, solid copper hydroxide was admixed with the alkaline solution in the proportion of 0.2 g. of the copper compound to 20 cc. of solution. The mixture was stirred at room temperature until substantially all copper hydroxide had dissolved and a deep blue-colored solution was obtained.

Afterwards, silk fibers were admixed with the blue liquid and the mixture allowed to stand for 1 hour at room temperature with occasional stirring. The proportion of silk fibers was 0.5 g. per 20 cc. of liquid. Nearly all of the silk dissolved and the small insoluble portion was separated by filtration.

A sample of bleached cotton cloth was saturated with some of the filtered solution by working the fabric in it for about 15 minutes at room temperature. Afterwards, the fabric was permitted to drain at room temperature and then washed successively with dilute aqueous hydrochloric acid and with water, and then dried. Increase in weight indicated that it contained 0.17 per cent of impregnating material.

Example 2.—An aqueous solution of copper hydroxide, $Cu(OH)_2$, was prepared according to the procedure of Example 1 but using the following proportions of material: 4 volumes of glycerine and 16 volumes of water, and then 0.4 g. of sodium hydroxide and 0.4 g. of copper hydroxide per 20 cc. of solution. Silk fibers were admixed with this solution in the proportion of 1 g. of fibers per 20 cc. of liquid. The mixture was allowed to stand at room temperature, with occasional stirring, for 1 hour. During this time most of the silk dissolved. The undissolved portion was separated from the liquid by filtration.

A sample of bleached cotton cloth was saturated with some of the filtered solution by working therein at room temperature. Afterwards, the cloth was allowed to drain, and then washed successively with dilute aqueous hydrochloric acid and with water. The sample was dried by exposing it to the atmosphere. Increase in weight indicated it contained substantially 10 per cent of impregnating sericeous material.

Example 3.—The impregnated samples from Examples 1 and 2 as well as the corresponding non-impregnated fabrics were dyed separately. In each instance, the dye bath consisted of 100 parts of water per 1 part of fabric and 5 per cent (on weight of sample) of a red acid dye (Fast Red SS Ex. Conc.). Fabrics were placed in the respective baths at room temperature, after which the temperatures of the baths were raised to 70° C. over a period of 30 minutes, kept at 70–75° C. for 10 minutes, and then allowed to cool to room temperature. The samples were removed from the baths, rinsed well with cold water, and dried.

The non-impregnated fabrics dyed to a light pink color. The sample containing 0.17 per cent of impregnating sericeous material was a light red in color after dyeing, and the cloth containing 10 per cent of impregnating material became a deep red in color.

Example 4.—An aqueous solution of copper hydroxide was prepared according to the procedure of Example 1 but using the following proportions of materials: 6 volumes of propylene glycol and 14 volumes of water, and 0.8 g. of potassium hydroxide and 0.7 g. of copper hydroxide per 20 cc. of aqueous glycol solution. In this instance there remained a very small residue of undissolved copper hydroxide and it was eliminated by filtration of the liquid. Silk fibers were admixed with the filtered solution in the proportion of 1.5 g. of fibers per 20 cc. of liquid. After the mixture had stood for 1 hour at room temperature, with occasional stirring, most of the silk had dissolved. The undissolved portion was separated by filtration.

Unbleached cotton cloth was saturated with some of the filtered solution of silk by working the fabric therein at room temperature. After the fabric had drained, it was washed with dilute aqueous hydrochloric acid, then with water, and dried. Increase in weight indicated it contained 0.67 per cent of impregnating material.

Example 5.—An aqueous solution containing dissolved copper hydroxide was prepared by using the following substances in the proportions indicated: 17 parts by weight of water, 3 parts of mannitol, 0.8 part of potassium hydroxide, and 0.7 part of copper hydroxide. The solution was admixed with silk fibers in the proportion of 1.5 g. of fibers per 20 cc. of solution. The mixture was allowed to stand for about 1 hour at room temperature with occasional stirring. Afterwards the liquid was separated from undissolved fibers by filtration.

Bleached cotton cloth was saturated with some of the filtered liquid by working therein at room temperature. Next, the cloth was allowed to drain at room temperature and then washed successively with dilute aqueous sulfuric acid and with water and finally dried. Increase in weight indicated the fabric contained 6.34 per cent of sericeous material.

Example 6.—An aqueous solution of glycerine was prepared by dissolving the polyhydroxy alcohol in twice its volume of water. In the solution was dissolved sufficient copper chloride ($CuCl_2 \cdot 2H_2O$) to give a solution containing substantially 14.2 per cent of the copper salt. To this copper solution was added very slowly, and with constant stirring, a 5 per cent aqueous solution of sodium hydroxide. At first copper hydroxide was precipitated, but as more of the alkaline solution was added the precipitate dissolved. The resulting solution was dark blue in color. From the final volume of this blue liquid and the volume of aqueous alkali employed, and allowing for the quantity of alkali metal hydroxide which had reacted with the copper salt to form copper hydroxide, it was estimated that the copper solution contained 3.4 per cent of sodium hydroxide.

Silk fibers were admixed with the blue liquid in the proportion of 5 g. of fibers to 50 cc. of liquid. After the mixture had stood for 1 hour at room temperature, with occasional stirring, the small quantity of undissolved fibers was separated from the liquid by filtration.

A sample of unbleached cotton cloth was saturated with some of the filtered liquid by working therein at room temperature. Afterwards, the fabric was allowed to drain and then was washed successively with dilute aqueous hydrochloric acid and with water and dried. Increase in weight indicated the fabric contained 2.8 per cent of sericeous material.

*Example 7.*—An aqueous solution of sericeous material was prepared in the following manner. 10 volumes of water were admixed with 2 volumes of propylene glycol and with 8 volumes of aqueous (10 per cent) tetraethyl ammonium hydroxide, and the resulting aqueous solution was saturated with copper hydroxide, $Cu(OH)_2$, by adding this compound to it in small portions and stirring the mixture. Afterwards, silk fibers were admixed with the blue aqueous solution containing copper in the proportion of 1 g. of fibers to 20 cc. of the liquid. The mixture was allowed to stand (with occasional stirring) at room temperature for one hour. Then the aqueous liquid was separated from undissolved fibers by filtration.

Bleached cotton cloth was saturated with some of the filtered liquid, allowed to drain at room temperature, and then washed with dilute aqueous sulfuric acid and afterwards with water. Increase in weight of this sample, after it was dry, indicated it contained 2.33 per cent of impregnating material.

*Example 8.*—In 20 parts of water were dissolved 1 part of cane sugar (sucrose) and 0.2 part of lithium hydroxide. Then copper hydroxide was admixed with this solution in the proportion of 0.4 g. to 20 cc. of liquid, and the mixture allowed to stand for 24 hours at room temperature with occasional stirring. Afterwards, the blue colored liquid was separated from undissolved copper hydroxide and admixed silk fibers in the ratio of 1 g. of fibers to 20 cc. of solution. This admixture was permitted to stand for 2.5 hours at room temperature (with occasional stirring) and then was filtered to separate undissolved fibers.

Unbleached cotton cloth was saturated at room temperature with some of the filtrate, allowed to drain at room temperature, and then was washed with dilute aqueous hydrochloric acid and afterwards with water. After drying, increase in weight of the fabric indicated it contained 0.78 per cent of impregnating material.

*Example 9.*—An aqueous solution which was suitable for impregnating cellulose fibers with sericeous material was prepared in the following manner: 14 volumes of water were admixed with 6 volumes of glycerine and lithium hydroxide was dissolved in this solution in the proportion of 1.2 g. per 20 cc. of liquid. The alkaline solution then was saturated with copper hydroxide by adding the latter to it in small portions and stirring constantly. An excess was added and the mixture allowed to stand overnight at room temperature. The clear blue liquid then was decanted from the undissolved compound and admixed with silk fibers in the proportion of 5 g. of fibers per 20 cc. of solution. After standing, with occasional stirring, at room temperature for 1 hour, the pasty mass was diluted with water. The volume of the latter was 1.5 times that of the solution of copper which was admixed with silk fibers. The diluted mixture was stirred well, allowed to stand at room temperature for 15 minutes, and then filtered. Substantially all of the silk had dissolved.

*Example 10.*—An aqueous alkaline solution was prepared by admixing 3 volumes of trimethylene glycol, 6 volumes of aqueous tetraethyl ammonium hydroxide (10 per cent) and 11 volumes of water. The resulting solution was saturated with copper hydroxide by adding the latter substance in small portions to the liquid and stirring. Then the mixture of aqueous liquid and excess copper compound was allowed to stand overnight at room temperature.

The blue-colored liquid was decanted from undissolved copper hydroxide and silk fibers were admixed with it, the quantity of fibers being slightly more than would dissolve. This mixture of liquid and fibers was permitted to stand overnight at room temperature and then filtered to eliminate undissolved fibers.

Unbleached cotton cloth was saturated with some of the filtered liquid, allowed to drain at room temperature, and the impregnated cloth was washed with dilute aqueous sulfuric acid and then with water. After it had dried, increase in weight of the fabric indicated it contained 1.8 per cent of impregnating material.

*Example 11.*—An aqueous solution which could be employed for impregnating cellulose fibers with sericeous material was prepared in the following manner: 10 per cent aqueous tetramethyl ammonium hydroxide was admixed with water in the proportion of 8 volumes of the alkaline solution to 12 volumes of water. In this solution was dissolved raffinose hydrate in the proportion of 1 g. of the polysaccharide to 20 cc. of the aqueous liquid. Afterwards, copper hydroxide was dissolved in the aqueous alkaline liquid in the proportion of 0.4 g. of the copper compound to 20 cc. of the liquid.

With the resulting solution were admixed silk fibers in the proportion of 1 g. of fibers to 20 cc. of liquid. This mixture was permitted to stand overnight at room temperature. Substantially all of the silk fibers dissolved during this time. More of the fibers were admixed with the solution in the proportion of 0.5 g. to 20 cc. of liquid. The mixture was permitted to stand for 3 hours at room temperature, with occasional stirring and then filtered to separate the small quantity of undissolved material.

As mentioned previously, the copper-solubilizing compounds which I prefer are water-soluble, saturated, acyclic, polyhydroxy alcohols. By saturated, I mean that these alcohols do not contain any olefinic or acetylenic linkages in their molecular structures. Also, these polyhydroxy alcohols should not contain either an aldehyde or a ketone group as the presence of either group may cause them to react with copper hydroxide when in aqueous alkaline solutions. The polyhydroxy bodies suitable for my purpose may be either liquids or solids.

The solubilities of the hydroxy compounds in water will vary quite widely. For the most part, those compounds which are liquids will be very soluble in water and even miscible with it in all proportions. With those polyhydroxy alcohols which are solids, greater variations in solubility are likely to be found. For example, of the hexahydroxy hexanes, the solubility of dulcitol in water at room temperature is of the order of 3 to 4 g. per 100 cc. of liquid, while that of mannitol is 16 to 18 g. per 100 cc. Again, the solubility of raffinose hydrate is about 14 g. per 100 cc. of water at room temperature, while that of sucrose is about 200 g. per 100 cc. For my purpose, I prefer that not less than about 1 per cent by weight of the polyhydroxy compound be present in solution and that the maximum proportion does not exceed about 50 per cent by weight. In the case of the polysaccharide sugars, because of the large number of hydroxyl groups per molecule, the maximum proportion may be about 30 per cent by weight.

It will be noted that the hydroxy compounds suitable for my purpose may contain two or more hydroxyl groups attached to adjacent carbon atoms, as for example, ethylene glycol, propylene glycol, glycerine α-monoethyl ether and erythritol. However, the hydroxy compounds may possess two or more hydroxyl groups which are separated by one or more carbon or other atoms, as illustrated by trimethylene glycol, diethylene glycol and pentaerythritol.

The alkaline agents which are used in this invention are alkyl metal hydroxides and tetra-alkyl ammonium hydroxides. These substances are strongly alkaline in aqueous solutions and also readily soluble in such a liquid medium. Preferably the tetra-alkyl ammonium hydroxides, such as tetramethyl and tetraethyl ammonium hydroxide, do not contain more than four carbon atoms in each alkyl group. I do not wish to limit this invention to those organic derivatives of ammonium hydroxide containing four like alkyl groups, as such alkaline bodies containing two or more unlike groups, e. g., ethyl trimethyl ammonium hydroxide, are suitable also.

As previously mentioned, solutions for impregnating cellulose can be prepared by dissolving from about 0.5 per cent to about 4 per cent by weight of the alkaline agent in the aqueous solution of polyhydroxy alcohol and then dissolving successively therein copper hydroxide and silk fibers. A modification of this procedure comprises increasing the initial proportion of alkaline agent to more than about 4 per cent but not exceeding about 10 per cent by weight. After dissolution of copper hydroxide in this solution of greater concentration of alkaline agent, and admixing silk fibers with the liquid and changing the fibers in a water-soluble copper-containing complex, then a sufficient volume of water is added to reduce the initial concentration of the alkaline agent to a value within the limits of about 0.5 per cent to about 4 per cent.

To illustrate, the proportion of alkaline agent dissolved in an aqueous solution of polyhydroxide is substantially 10 per cent by weight, the alkaline aqueous solution is saturated with copper hydroxide and afterwards admixed with silk fibers. This procedure often leads to the formation of a thick viscous, or even pasty, mass which is not applicable readily to impregnation or saturation of cellulose fibers therewith. This mass then is diluted (or admixed) with a volume of water sufficient to reduce the initial concentration of alkaline agent to a value within the limits of 0.5 to 4 per cent. Thus, if 100 cc. of the aqueous solution of polyhydroxy alcohol initially contained 10 per cent of sodium hydroxide then, after dissolution of copper hydroxide and admixture with silk fibers, addition of 150 cc. of water will be necessary to reduce the initial concentration of alkali to about 4 per cent. Or, addition of 400 cc. of water will be required to reduce the initial concentration of alkali to approximately 2 per cent. This dilution with water, followed by filtration of the resulting aqueous solution if needful, furnishes an aqueous liquid which contains dissolved sericeous material and which is applicable readily to impregnation of cellulose fibers therewith.

The proportion of copper hydroxide which can be dissolved in the aqueous solution of alkaline agent and polyhydroxide will depend to a large degree upon the proportion of alkaline agent. Possibly for economic reasons it may be the better procedure in many instances to saturate the aqueous solution of alkaline agent and polyhydroxy alcohol with copper hydroxide ($Cu(OH)_2$), as the quantity of silk fibers which will dissolve appears to depend upon the quantity of copper compound in solution. However, I do not wish to limit my invention to those solutions which are saturated with copper hydroxide. It is necessary that sufficient copper be present in solution so that an appreciable and substantial proportion of silk fibers will dissolve therein, not merely a trace or insignificant quantity. Moreover, since the proportions of dissolved alkaline agent, polyhydroxy alcohol and copper compound are factors which determine the proportion of silk fibers which will dissolve, by varying one or more of these factors I can effect a considerable variation in the proportion of dissolved sericeous material.

After cellulose fibers have been impregnated with the solution of sericeous material they are washed with an aqueous solution of an acidic agent which will form water-soluble salts with the alkaline agent and with copper hydroxide. These acidic agents may be either inorganic or organic compounds and examples of them are hydrochloric, hydrobromic, sulfuric, acetic or lactic acid. The only limitations placed upon the concentration of the aqueous solution of acidic agent are (1) it must be sufficiently great that the solution will remain acidic during washing of the impregnated fibers but (2) not sufficiently great to exert any harmful or deleterious effect on the fibers being washed.

After the cellulose fibers have been washed with the aqueous solution of acidic agent, they are washed with water. This step is necessary as it is my purpose to remove substantially all of the salts (including copper salts) and substantially all of the acidic agent as well as the polyhydroxy alcohol from the cellulose fibers.

Cellulose fibers which are unbleached, bleached or mercerized may be impregnated with the solutions of sericeous material. It is desirable that extraneous substances such as sizing be removed from these fibers by an alkali boil or other appropriate treatment prior to impregnation with solutions of sericeous material. The silk fibers suitable for my purpose may be either bleached or unbleached. It is desirable that such fibers be substantially devoid of silk gum and of weighting agents.

Although I have illustrated my invention by only one treatment (impregnation, washing and drying) of cellulose fibers, I do not wish to be limited in this manner. If the proportion of sericeous material is not sufficiently great after one treatment, then the cellulose fibers can be given one or more additional treatments and thereby increase the proportion of sericeous material impregnated in them.

What I claim is:

1. An aqueous solution in which are dissolved not less than about 0.5 per cent and not more than about 4 per cent by weight of an alkali metal hydroxide; not less than about 1 per cent and not more than about 50 per cent by weight of a water-soluble copper-solubilizing saturated acyclic neutral polyhydroxy compound; copper hydroxide; and silk.

2. The solution according to claim 1 in which the alkaline agent is sodium hydroxide.

3. The solution according to claim 1 in which the alkaline agent is potassium hydroxide.

4. The solution according to claim 1 in which the alkaline agent is lithium hydroxide.

5. An aqueous solution in which are dissolved not less than about 0.5 per cent and not more than about 4 per cent by weight of an alkali metal hydroxide; not less than about 1 per cent and not more than about 50 per cent by weight of a water-soluble acyclic saturated polyhydroxy mono-ether having at least two of the hydroxyl groups on adjacent carbon atoms; copper hydroxide; and silk.

6. The solution according to claim 5 in which the polyhydroxy mono-ether is glycerol $\alpha$-monoethyl ether.

7. The solution according to claim 5 in which the polyhydroxy mono-ether is glycerol $\alpha$-monoglyceryl ether.

References Cited in the file of this patent

UNITED STATES PATENTS

| Number | Name | Date |
|---|---|---|
| 2,102,933 | Yamamoto | Dec. 21, 1937 |
| 2,417,388 | Whitner | Mar. 11, 1947 |